United States Patent
Santilli et al.

[11] 3,923,991
[45] Dec. 2, 1975

[54] 1,6-BIS(2-PIPERIDINOETHOXY)XANTHENE-9-ONE HCL, HYDRATE IN THE TREATMENT OF INFLAMMATION

[75] Inventors: Arthur A. Santilli, Havertown; Anthony C. Scotese, King of Prussia; Stanley C. Bell, Penn Valley; Marvin E. Rosenthale, Havertown, all of Pa.

[73] Assignee: American Home Products Corporation, New York, N.Y.

[22] Filed: Oct. 16, 1973

[21] Appl. No.: 406,996

Related U.S. Application Data

[63] Continuation-in-part of Ser. No. 256,034, May 23, 1972.

[52] U.S. Cl. .............. 424/267; 424/244; 421/283
[51] Int. Cl.² A61K 31/33; A61K 31/35; A61K 31/445
[58] Field of Search ........ 260/293.58, 335; 424/267

[56] References Cited
UNITED STATES PATENTS

| | | | |
|---|---|---|---|
| 2,732,373 | 1/1956 | Steiger | 260/279 |
| 3,294,803 | 12/1966 | Rosi et al. | 260/293.4 |
| 3,555,043 | 1/1971 | Archer | 260/328 |
| 3,577,558 | 5/1971 | Rosi | 260/328 |
| 3,592,819 | 7/1971 | Fleming et al. | 260/294.7 C |
| 3,646,030 | 2/1972 | Milani | 260/247.7 F |

OTHER PUBLICATIONS
R. F. Krueger et al., at 11th Interscience Conference, Atlantic City, 1970, reported in *Federation Proceedings*, Vol. 29, No. 2, Abstract 2190, published by Federation of American Societies for Experimental Biology.

*Primary Examiner*—Stanley J. Friedman
*Attorney, Agent, or Firm*—Joseph Martin Weigman

[57] ABSTRACT

The disclosure is directed to bis(substituted alkyloxy)xanthen-9-ones which have the formula

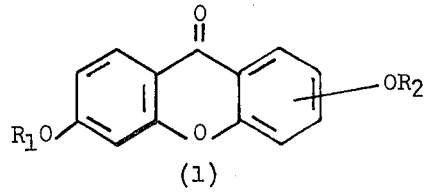

where $R_1$ and $R_2$ are the same and are di(lower)alkylamino(lower)alkyl, piperidino(lower)alkyl, or hexamethyleneimino(lower)alkyl. The compounds have anti-inflammatory and immunoregulant activity when evaluated in standard pharmacological procedures, and activity as interferon inducers.

1 Claim, No Drawings

1,6-BIS(2-PIPERIDINOETHOXY)XANTHENE-9-ONE HCL, HYDRATE IN THE TREATMENT OF INFLAMMATION

This application is a continuation-in-part of application Ser. No. 256,034 filed May 23, 1972.

This invention relates to new and useful bis(substituted alkyloxy)xanthen-9-ones and their pharmaceutically acceptable addition salts. The chemical structure of the compounds of the invention may be schematically represented by

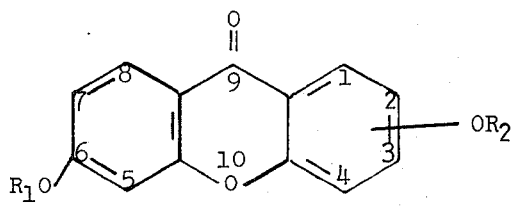

(I)

where $R_1$ and $R_2$ are the same and are selected from the class consisting of di(lower)alkylamino(lower)alkyl, piperidino (lower)alkyl, and hexamethyleneimino(lower)alkyl, with the proviso that $OR_2$ is in the 1, 2 or 3 position. The piperidino (lower)alkyl, and hexamethyleneimino(lower)alkyl derivatives are novel compounds. The use of the compounds as interferon inducers is subject to the further proviso that when $R_2$ is dimethylaminoethyl $OR_2$ is in the 1 or 2 position.

The term "lower alkyl" as used herein refers to straight chain and branched chain groups having 1 to 3 carbon atoms therein.

Specific embodiments of the invention are 1,6-bis[2-(diethylamino)ethoxy]xanthen-9-ones, dihydrochloride and 1,6-bis(2-piperidinoethoxy)xanthen-9-one, dihydrochloride, hydrate.

The preparation of these compounds may be represented schematically by the following equation:

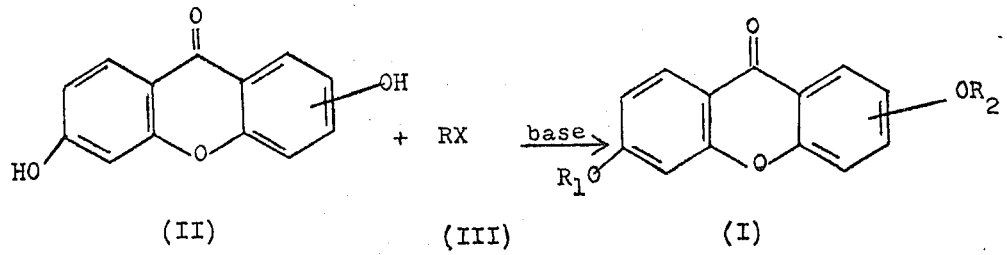

where $R_1$ and $R_2$ are as defined above, R, $R_1$ and $R_2$ are the same, and X is halogen.

The closest known prior art is

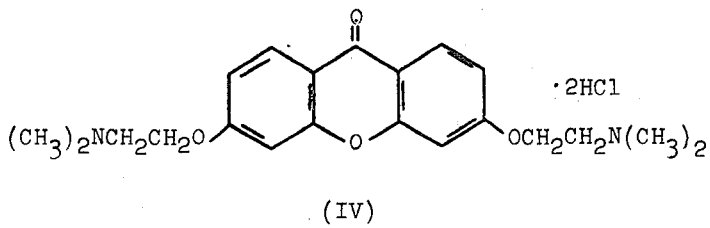

which was described in a paper presented by R. F. Krueger et al. at the 11th Interscience Conference, Atlantic City 1970, which was reported in *Federation Proceedings* Vol. 29 No. 2, abstract 2190, published by Federation of American Societies for Experimental Biology.

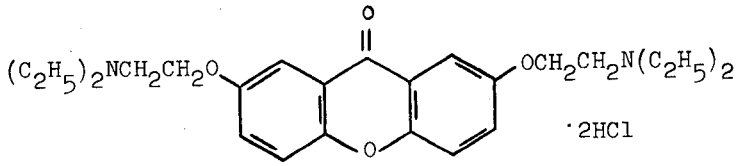

(V)

which is described in U.S. Pat. No. 2,732,373 that issued on Jan. 24, 1956 to N. Steiger and alleged the compounds to be useful as anthelmintics, antifungals, and the like.

The starting material 3,6-dihydroxy-9-oxoxanthene is described in P. K. Grover, G. D. Shah and R. C. Shah, J. Chem. Soc. 3982 (1966). The starting material, 1,6-dihydroxy-9-oxoxanthene is described in the same paper. The starting material 2,6-dihydroxy-9-oxoxanthene is described in O. P. Mittal and T. R. Seshodri, J. Sci. Ind. Research (India) 14B, 76 (1966) C. A. 49, 8932 (1955).

Compounds of the present invention may be prepared by the following procedure. A stirred mixture of a dihydroxy-9-oxoxanthene of formula I and a halide of a di(lower) alkylamino(lower)alkyl or a piperidino(lower)alkyl or a hexamethyleneimino(lower)alkyl, and a strong base, such as 50 percent sodium hydroxide dispersed in an organic solvent, such as xylene, is heated under reflux for 1 to 24 hours while water is removed by azeotropic distillation. Alternatively, a strong base such as thallous ethoxide dispersed in an alkanolic solvent, such as methanol and ethanol may be used.

Preferably the mixture is heated for about 6 hours. The product may then be recovered by well known means. For instance, the reaction mixture is filtered and the filtrate extracted with an acidic solution, such as 10 percent hydrochloric acid. The water layer is then basified, for instance to pH 9, with a strong base, such as ammonium hydroxide. The resulting precipitate is removed by filtration and recrystallized, for instance from 50 percent aqueous ethanol. The material is dissolved, for instance in ether, and acidified, for instance with alcoholic hydrochloric acid, to afford the product, bis(substituted alkoxy)xanthen-9-one (I).

The compounds of this invention exhibit significant anti-inflammatory and immunoregulant activity in standard pharmacological tests. Immunoregulant activity includes both immunosuppressive and immunostimulant depending on experimental conditions. The daily dose is 0.25 to 10 MPK (milligrams per kilogram of host body weight) with best results being obtained at a daily dose of 0.5 to 4 MPK.

In the pharmacological evaluation of the anti-inflammatory activity of the compound of this invention, the in vivo effects are tested as follows. The effect of the compounds of the invention on adjuvant arthritis was evaluated. Arthritic disorders may owe their pathogenesis to sensitization and subsequent immunologic cellular attack of various tissues particularly connective tissue and synovial membranes of the joints. Adjuvant arthritis is an excellent experimental pathologic model because of its immunological etiology and histopathological features which resemble various human immuno-inflammatory disease.

Male, Lewis rats (185–225) were randomly dispersed into groups and were injected into the subplantar portion of the right hind paw on day 0 with a suspension of heat-killed tubercle bacilli in mineral oil. The test compounds were prepared by grinding in a ground glass tissue homogenizer, and were administered orally with a metal feeding tube as aqueous suspensions containing one drop of Tween 80. A normal and a positive arthritic control group were given vehicle only. The test compounds were administered either on the day of adjuvant (day 0) and continued daily (once a day) for 16 consecutive days, or were given beginning with day 14 when an established poluarthritis was evident. Total body weights were obtained at frequent intervals. Leg volumes were measured at intervals during the test by means of a mercury plethysmograph, and polyarthritis of the ears, front legs and tail were evaluated by a visual scoring system. Hematologic and organ weight studies and stomach examinations were performed by standard methods at the times indicated. The results are shown in Table 1 and Table 2.

When evaluated in the foregoing procedure the compounds of the present invention showed significant anti-inflammatory activity at a dose of 12 to 150 MPK. Some deaths were observed at doses of 75 and 150 MPK with 1,6-bis[2-diethylamino)ethoxy]xanthen-9-one, dihydrochloride.

In the tables the following identification of compounds is used.

Compound A is 1,6-bis[2-(diethylamino)ethoxy]xanthen-9-one, dihydrochloride.

Compound B is 3,6-bis(2-diethylaminoethoxy)xanthene-9-one, dihydrochloride, hydrate.

Compound C is 2,6-bis(2-diethylaminoethoxy)xanthen-9-one, dihydrochloride, hydrate.

Compound D is 1,6-bis[2-(diisopropylamino)ethoxy]xanthen-9-one.

Compound E is 1,6-bis(2-piperidinoethoxy)xanthen-9-one, dihydrochloride, hydrate.

Compound F is 1,6-bis[2-(hexahydro-1H-azepin-1-yl)ethoxy]xanthen-9-one.

In Table 2 methyl is abbreviated "Me"; ethyl is abbreviated "Et"; "+" indicates activity was found; "−" indicates no activity was found; and "±" indicates uncertain results.

An alternate nomenclature for Compound F is 1,6-bis-[2-(1-hexamethyleneimino)ethoxy]xanthen-9-one.

TABLE 1

| | | Effect on Adjuvant Arthritic Rats | | | | | |
|---|---|---|---|---|---|---|---|
| Compound | Daily Oral Dose (mg/kg)[a] | % Inhibition | | | % Inhibition Poly Arth. Score | No. With Poly Arth. Signs | Body Wgt (gms) |
| | | Day 4 Rt. Paw | Day 16 Lt. | Rt. | | | |
| Normals | — | — | — | — | — | — | +94 |
| Arthritic Controls | — | — | — | — | — | 32/32 | −14 |
| A | 12 | 18 | 48 | 27 | 48 | 8/8 | −8 |
| | 25 | 44 | 87 | 53 | 78 | 7/8 | +7 |
| | 35 | 46 | 52 | 78 | 66 | 8/8 | +34 |
| | 75 | 35 | 98 | 65 | 89 | 8/15[d] | +7 |
| | 75 | 62 | 71 | 88 | 75 | 7/8 | +36 |
| | 150 | 78 | 90 | 83 | 96 | 1/6[e] | −51 |
| | 100[b] | 67 | 26 | 39 | 46 | 8/8 | +15 |
| | 100[c] | 41 | 84 | 54 | 92 | 3/8 | +25 |
| | 100[c] | 58 | 50 | 71 | 64 | 7/8 | +40 |

[a]Drug administered daily (7 × wk) day 0 to day 15 (16 consecutive doses)
[b]Drug administered day 0 to 1 (2 consecutive doses) only.
[c]Drug administered days 0, 1, 2 and 3 (4 consecutive doses) only.
[d]1/16 dead
[e]2/8 dead

TABLE 2

Structure-Activity Relationship

| Compound | Activity in Arthritic Rats | Dose Tested (mg/kg P.O.) |
|---|---|---|

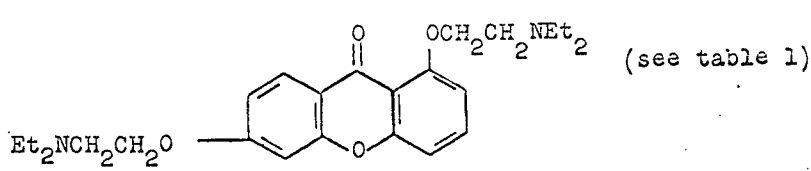

A (see table 1)

TABLE 2—Continued

| Compound | Structure-Activity Relationship | Activity in Arthritic Rats | Dose Tested (mg/kg P.O.) |
|---|---|---|---|
| B | Et₂NCH₂CH₂O—[xanthone]—OCH₂CH₂NEt₂ | + | 50 |
| C | Et₂NCH₂CH₂O—[xanthone]—OCH₂CH₂NEt₂ | + | 75 |
| D | (Me₂CH)₂NCH₂CH₂O—[xanthone]—OCH₂CH₂N(CHMe₂)₂ | + | 75 |
| E | piperidinyl-CH₂CH₂O—[xanthone]—OCH₂CH₂N-piperidinyl | + | 75 |
| F | pyrrolidinyl-CH₂CH₂O—[xanthone]—OCH₂CH₂N-pyrrolidinyl | Toxic + | 35 10 |

These results show a dramatic effect of Compound A in prophylaxis of adjuvant arthritis in the rat. Significant inhibition (greater than 30%) of paw swelling was evident at various doses on both the injected and non-injected paws. Inhibition of the primary swelling of the injected right leg (day 4) reflects activity against the acute inflammatory phase (immunosuppressive agents do not work here), while activity versus both the right injected and non-injected left leg of the secondary response indicates effectiveness against the chronic phase and can be obtained in immunosuppressive as well as steroidal and non-steroidal agents. In addition both the severity and incidence of polyarthritic signs were decreased. Immunosuppressive agents are generally the most effective type agent for decreasing polyarthritic incidence in rats. Body weight gain was obtained with several doses of either compound.

The results of Table 2 indicate that various isomers of Compound A are active and the two side chains may be in the 1, 2 or 3 position (compounds B, C, D).

TABLE 3

| Compound | | Effect on Mean Polyarthritic Score | | | | | | 42 days |
|---|---|---|---|---|---|---|---|---|
| | | 16 | 22 | 25 | 29 | 33 | 37 | |
| Control | | 5.4 | 5.2 | 5.0 | 3.9 | 2.6 | 2.4 | 1.2 |
| A | 35 mg/kg | 4.9 | 2.9 | 2.9 | 3.9 | 3.4 | 2.4 | 0.9 |
| A | 100 mg/kg | 5.1 | 2.4 | 2.8 | 3.2 | 1.6 | 1.4 | 0.4 |

A decrease in score was observed on day 22. After 7 total doses and with the exception of the low dose of Compound A scores lower than controls were obtained until day 33 after which low control results made comparison difficult. These results support those obtained with paw measurements which show an anti-arthritic effect in established adjuvant arthritis.

The effect on organ weights and hematology was evaluated. Sixteen to 18 days after administration of effective doses of Compound A to adjuvant rats, autopsies and hematologic counts were done by standard techniques. The results are shown in Table 4.

TABLE 4

| Compound | Oral Dose (mg/kg) | Effect on Adjuvant Arthritic Rats | | | | Hematology | |
|---|---|---|---|---|---|---|---|
| | | Organ Weights (mgm)$^a$ | | | WBC $\times 10^3 mm^3$ | Poly % | Lymph % |
| | | Thymus | Spleen | Adrenals | | | |
| Normal | — | 555 | 568 | 36 | 13.4 | 19 | 78 |
| Pos Control | — | 138 | 835 | 59 | 72.2 | 59 | 37 |
| Pos Control | — | 194 | 1562 | 51 | 81.2 | 67 | 26 |
| | 35 7×$^b$ | 431 | 939 | 42 | 20.2 | 56 | 50 |
| | 75 7× | 310 | 738 | 49 | 22.6 | 46 | 48 |
| | 75 7× | 376 | 877 | 43 | 18.4 | 51 | 42 |
| | 100(0,1,)$^c$ | 222 | 784 | 53 | 35.7 | 66 | 27 |
| | 100(0,1,2,3) | 347 | 881 | 44 | 21.7 | 47 | 49 |
| | 100(0,1,2,3) | 342 | 938 | 44 | 25.9 | 54 | 39 |

$^a$Day 16 to 18 after antigen. Antigen given on day 0. Eight rats per dose.
$^b$7 × daily for 16 consecutive doses
$^c$Day of drug administration The effect of the compounds of the invention on established arthritis was evaluated. Adjuvant arthritis was induced as previously described and the resulting polyarthritic syndrome was evaluated on day 16. Daily administration of the test compound was begun on day 16 and continued until day 32 (16 consecutive doses). Anti-arthritic effects were evaluated as before; however, in this test the treatment rather than the prevention of disease was evaluated. Doses of Compound A were extremely effective in reducing the volume of either paw. There was a delay in onset of effect of about 7 days with the low dose of Compound A but the higher dose of Compound A caused a drop in paw volume during this period. The effectiveness of Compound A was dose related. Compound A was more effective on the right (injected) paw, a common finding with other anti-inflammatory agents. The effectiveness of the drug was long-lived; a rebound effect was not observed until day 56, which was 24 days after the last dose of drug. This is in contrast with other agents, particularly steroids, where a rapid rebound effect is obtained shortly after cessation of drug. No toxicity was noted; in fact, animals showed good body weight gain throughout the treatment and post-treatment phase. The effects of Compound A on the mean polyarthritic scores compared to controls are shown in Table 3. In Table 3 the maximum attainable score is 6.0.

Thymic involution, hypertrophy of the spleen and adrenals, accompanied by leucocytosis and neutrophilia with a relative lymphopenia occurred in adjuvant arthritic rats as previously described. Compound A was capable of altering these pathologic changes towards normal at low, non-toxic level doses. In fact just two doses given at day 0 and 1 were sufficient to evidence an excellent therapeutic response (also see Table 1).

The effect of the test compounds on immune mechanisms was evaluated. Various immunosuppressive agents have been shown to exert anti-inflammatory activity without inhibiting immune response, and non-steroidal antiinflammatory drugs have properties in common with immunosuppressives such as inhibition of cellular migration and prevention of protein production by leucocytes. Thus, the effects of anti-inflammatory compounds on the immune response in several systems was considered.

Experimental allergic encephalomyelitis (EAE) is a model of delayed hypersensitivity which has been useful in evaluating various anti-immune compounds. Male, Lewis strain rats (165–190 gms) were used. Animals were randomly grouped 4 rats per cage; room temperature and artificial lighting were controlled. EAE was induced by the subplantar injection of 0.05 ml of an encephalitogenic emulsion consisting of equal parts of a 40% w/v (weight per volume) homogenate of isologous spinal cord (from Lewis rats) in 0.5% aqueous phenol and Freund's complete adjuvant (4 mg/ml killed tubercle bacilli into the right hind paw. The results are seen in Table 5.

When evaluated in the foregoing procedure Compound A showed significant immunosuppressive activity at doses of 2.5 to 75 milligrams per kilogram (MPK) of host body weight which were non-lethal.

steroidal and non-steroidal anti-inflammatory agents, chloroquine, and colchicine (Table 6).

In Table 6 the mean number of PMN's migrating through a single high powered field were counted. Thirty fields were counted per test compound dilution.

TABLE 5

| Compound | Effects on Experimental Allergic Encephalomyelitis in Rats[a] | | | | |
|---|---|---|---|---|---|
| | Oral Dose mg/kg (Frequency-Days) | Total No. Doses | Total Dose mg/kg | No. Paralyzed/ No. Tested | Body Wgt (Gms) |
| EAE Control | — | — | — | 15/16 | −12 |
| A | 12.5 7×[b] | 15 | 187.5 | 0/8 | +6 |
| A | 25 7×[c] | 15 | 375 | 0/8 | 0 |
| A | 75 7×[d] | 15 | 1125 | 0/8 | −3 |
| A | 75(9,10,11,12)[e] | 4 | 300 | 0/8 | −9 |
| A | 75(10,11,12,13)[f] | 4 | 300 | 1/8 | +10 |

[a]Antigen administered day 0. Results evaluated day 14 to 16; rats observed over a 30 day period.
[b]1/8 delayed death 3/8 delayed paralysis.
[c]2/8 delayed death 1/8 delayed paralysis.
[d]2/8 delayed paralysis (day 24).
[e]2/8 delayed death 4/8 delayed paralysis.
[f]1/8 delayed paralysis.

TABLE 6

| | Effect on Migration of Polymorphonuclear Leucocytes Concentration (mgm/ml) | | | | | | | |
|---|---|---|---|---|---|---|---|---|
| Compound | O | $1 \times 10^{-6}$ | $10^{-5}$ | $10^{-4}$ | $10^{-3}$ | $10^{-2}$ | $10^{-1}$ | 1 |
| A | 60 | — | — | — | 29 | 27 | 5 | 1 |
| A | 33 | 28 | 22 | 23 | 14 | — | — | — |
| A | 63 | — | 32 | 27 | 34 | 9 | 1 | — |

Compound A was an extremely effective agent in preventing EAE. The compound also had considerable activity when given as late as 10 days after antigen. Most immunosuppressive agents experience a drastic reduction in their effectiveness when given 8 or more days after antigen. Some delayed toxicity and paralysis was observed after cessation of either compound, a common finding among agents effective in this model. Body weight gain occurred at two effective doses of Compound A. This result indicates that Compound A is a potent immunosuppressive agent.

The effect on polymorphonuclear leucocyte (PMN) migration was evaluated. Inflammatory processes are often characterized by accumulation of various cellular elements such as PMN's monocytic cells, and the like, which are necessary for the initiation and prolongation of the inflammatory response. The anti-inflammatory acticity of various agents may in part be explained by their ability to suppress PMN motility, thereby preventing these cells from reaching involved tissues. The method consits of quantifying the total number of rabbit PMN's, obtained by peritoneal lavage, which migrate to the surface of a millipore filter in response to a chemotactic factor released by E. Coli. A modification of the Boyden chamber technique and 3 micron millipore filters were used. PMN's were placed in contact with various dilutions of the agents being tested and after a suitable incubation time the total number of cells in 30 high powered microscopic fields were counted and compared with controls. Compounds detected by this test include various Compound A depressed PMN migration by 50 percent at doses from $1 \times 10^{-5}$ to $1 \times 10^{-3}$ mgm/ml thus comparing favorably with drugs such as chloroquine and colchicine. Doses of $1 \times 10^{-1}$ decreased migration to levels as low or lower than that observed for random background migration (no chemotactic agent). Inhibition of migration might indicate a toxic effect on PMN's therefore viability studies were undertaken.

The polymorphonuclear leucocyte (PMN) viability was evaluated. The object of this test was to determine the toxicity of the compounds being evaluated, when drug and the PMN cells are incubated together as described for the cell migration studies. PMN's were harvested from the peritoneal cavity of a rabbit after 4 hour stimulation with 100 ml of 0.1 percent shell fish glycogen. Cells were centrifuged and washed, suspended in Hanks-199 containing 10 percent rabbit serum (Pel Freeze) and adjusted to a concentration of 2 to 6 million cells per ml. The compounds were dissolved in Hanks-199 serum at appropriate dilutions and incubated for 2 hours at 37°C in the presence of PMN's. Cells were then removed and added to an equal volume of freshly prepared 0.75 percent eosin-Y in Hanks-199. Cells were then examined under the microscope and a high power count of 100 cells was obtained. Dead cells are stained with the dye while viable cells remain unstained. Formaldehyde was used as a positive control. Results are shown in Table 7.

The results are expressed as percentage of killed (stained) cells in PMN suspension. Cells were in PMN suspension, and 100 cells differentially counted.

TABLE 7

Effect on Polymorphonuclear Leucocyte Viability

| Compound | Expt. No. | Drug Concentration (mgm/ml) | | | | | | |
|---|---|---|---|---|---|---|---|---|
| | | 0 | $1 \times 10^{-5}$ | $10^{-4}$ | $10^{-3}$ | $10^{-2}$ | $10^{-1}$ | 1 |
| A | 1. | 0 | 0 | 0 | 1 | 7 | 12 | — |
| A | 2. | 2 | 0 | 0 | 2 | 10 | 13 | 25 |
| A | 3. | 1 | 0 | 1 | 2 | 7 | 15 | 26 |
| Dexamethasone phosphate | | — | — | — | — | 0 | 0 | 0 |
| Indomethacin | | — | — | — | — | 6 | 15 | 24 |
| Iodoacetic Acid | | — | — | — | — | 2 | 6 | 10 |
| Methotrexate | | — | — | — | — | 0 | 4 | 0 |
| Cyclophosphamide | | — | — | — | — | 0 | 3 | 3 |
| 6-Mercaptopurine | | — | — | — | — | 4 | 5 | 9 |
| Cytarabine | | — | — | — | — | 0 | 0 | 0 |
| Fluoro-2'-deoxyuridine | | — | — | — | — | 0 | 0 | 0 |
| Cycloheximide | | — | — | — | — | 0 | 0 | 3 |
| Vinblastine Sulfate | | — | — | — | — | 0 | 2 | 8 |
| Hydroxy Urea | | — | — | — | — | 0 | 0 | 0 |

Compound A induced a greater than background cell death at doses of $10^{-2}$ mgm/ml (10 mcg/ml). This compound was also capable of inhibiting PMN migration at doses of $10^{-3}$ mgm/ml (1 mcg/ml) or lower (Table 6). These data support the conclusion that inhibition of PMN leucocyte migration by compound A is possible at sub-toxic doses.

The effect on immunocompetent cell production was evaluated. This method involves inoculation of mice with an antigen (sheep red cells) and determination of the effect of an agent on the number of antigen-producing spleen cells (per million) after a 4 day period (Jerne plaque test). In addition humoral antibody response was also determined. The following protocol was used to test drug effects.

The method used was basically that of Jerne but recently modified by Dr. Kaliss (Transplantation Vol. 12, pp. 146, 1971). The experiment included two groups given the test compound. In one group Compound A was given on Monday, Tuesday and Wednesday and in the second group Compound A was given on Thursday, Friday and Saturday. The antigen (sheep red blood cells) was inoculated into all of the mice on Thursday and the mice were sacrificed on the following Monday (4 days after the antigen stimulus). These two groups permitted a simple comparison of the effect of the compound given "before" and "after" antigen administration.

The foregoing may be expressed as follows:

```
Group        A           B
Day       [ 1 2 3 ]   [ 4 5 6 ]   7 8
                         ↑        ↑
                      ANTIGEN  ANALYSIS
Group A.  Compound A at 100 mg/kg P.O. day 1-3
      B.  Compound A at 100 mg/kg P.O. day 4;
```

-continued

```
Group        A           B
Day       [ 1 2 3 ]   [ 4 5 6 ]   7 8
                      ANTIGEN  ANALYSIS
                      75 mg/kg day 5 and 6
```

Cycloleucine given in two doses of 50 mg/kg orally each on days 8 and 1 before antigen. Cycloleucine is a reference immunosuppressive.

Table 8 gives complete details of the plaque test and Table 9 shows the humoral antibody titer analysis.

TABLE 8

Effect on Plaque-Forming Cell Production

| Compound | Mean Number Plaques[a] Per Plate (± S.E.) | t | P |
|---|---|---|---|
| Compound | 374 ± 26.6 | | |
| A (Group A)[b] | 254.5 ± 24.2 | 3.2 | 0.01 |
| A (Group B) | 675.5 ± 41 | 6.1 | <0.01 |
| Cycloleucine | 147.7 ± 5.95 | 8.3 | 0.01 |

[a] N = 4 mice per group. Each analysis done in triplicate.
[b] 1/4 dead after 3rd dose. Results shown are mean of 3 mice.

TABLE 9

Hemagglutination titers in pooled mouse sera (inactivated at 58° for 30 minutes)

| Compound | Time & Temperature | Dilution | | | | | | Titer |
|---|---|---|---|---|---|---|---|---|
| | | 8 | 16 | 32 | 64 | 128 | 256 | |
| Control | 2 hrs - 22° | + | + | + | + | 0 | 0 | 6 |
| | Overnight-4°C | +/0 | +/0 | +/0 | +/0 | 0 | 0 | 64/<8 |
| A | 2 hrs - 22° | + | + | + | + | + | ± | 128 |
| (Group A) | Overnight-4°C | + | + | + | + | + | 0 | 128 |
| A | 2 hrs - 22° | + | + | + | + | + | + | >256 |
| (Group B) | Overnight-4°C | + | + | + | + | + | ± | 128 |
| Cycloleucine | 2 hrs - 22° | 0 | 0 | 0 | 0 | 0 | 0 | <8 |
| | Overnight-4° | 0 | 0 | 0 | 0 | 0 | 0 | <8 |

Cycloleucine, (1-aminocyclopentanecarboxylic acid) as expected, caused the plaque count to drop by almost 50 percent. The final results were unexpected. When Compound A was given before the antigen administration, there was a slight but significant drop in the number of plaques. However, when the drug was given on the day of antigen administration and thereafter, there was a sharp rise equivalent to about twice the controls (Table 8).

Cycloleucine also completely suppressed all hemagglutination (Table 9). However, treatment with Compound A caused an increase in the level of hemagglutinin. The hemagglutination study was done in the following way: a serial dilution of the serum was made and the sheep red cells added. These were incubated at 22°C. for two hours and then read. The first reading was then recorded. The tubes were shaken up and put into a refrigerator overnight and a second reading made the next day. On both readings, the effect of Compound A was to increase the level of hemagglutination. It was noted that there was a qualitative difference in the characteristics of the agglutinated cells. In the controls (immunized but not treated with the test compound), the test cells formed a very weak aggregate which could be very easily broken up by shaking. However, in the serum of the treated mice, the aggregates were very firm and agglutination could not be dispersed.

The activity of the compounds as interferon inducers was determined. A dose of 2 milligrams per mouse of test compound was injected intraperitoneally. The mouse sera were harvested at 2,6, and 24 hours post-injection. The sera were assayed for interferon in cultures of L-cells (a strain of mouse fibroblasts). The interferon titer ranged from less than to equal to the interferon titer induced by 2,7-bis(2-diethylaminoethyloxy)fluoren-9-one, dihydrochloride (Tilorone).

Compound E and F induced interferon at a level less that that of Tilorone as did the propoxy homolog of Compound E: 1,6-bis(3-piperidinopropoxy)xanthen-9-one, dihydrochloride, hydrate.

Compounds A, B and C induced interferon at a level equal to that of Tilorone.

The results for Compound C are shown in Table 10.

TABLE 10

Results of Interferon Induction

| Time After Injection | Serum Interferon Titer |
|---|---|
| 2 hours | <10 |
| 6 hours | 20 |
| 24 hours | >80 |

The results show compound C to be an active interferon inducer.

SUMMARY OF TEST RESULTS

The profile of Compound A is shown in the following table.

in a standard testing program. Compound A is an analog of the known interferon inducer 2,7-bis(2-diethylaminoethyloxy) fluoren-9-one, dihydrochloride (Tilorone). In the tests where they were compared, a similarity exists between both compounds.

The lack of activity of Compound A in the early vascular and humoral phases of inflammation (carrageenin and yeast paw, bradykinin antagonism, urate synovitis and biochemical tests on albumin), suggests that this agent is unlike the steroidal and acidic non-steroidal anti-inflammatory drugs. The activity against the immunologic phase (late phase of adjuvant arthritis and allergic encephalomyelitis), suggests similarities to immunosuppressive agents. However, activity in the early and established phases of adjuvant arthritis and lack of effect (even potentiation) on humoral antibody or plaque cell formation is not consistent with the effects of an immunosuppressive drug. Thus, Compound A does not fit the patterns previously described for standard therapeutic agents.

Various polyanions such as pyran copolymer, synthetic polynucleotides such as Poly A:U; I:C and antibiotics such as Statolon have been shown capable of inducing interferon production, inhibiting adjuvant arthritis (Statolon and pyran copolymer), being anti-tumor (Poly I:C), enhancing cell mediated immune response (Poly I:C) or antibody formation (Poly A:U).

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions or they may be injected parenterally, that is, intramuscularly, intravenously or subcutaneously. For parenteral administration they may be used in the form of a sterile solution containing other solutes, for example, enough saline or glucose to make the solution isotonic.

TABLE 11

Effects on Anti-inflammatory Agents in Several Immunopharmacologic Test Systems

| System | Steroids | Non Steroids | Immuno-Suppressives | Compd. A |
|---|---|---|---|---|
| Carrageenin Paw Edema | + | + | − | − |
| Yeast Inflamed Paw | + | + | − | − |
| Bradykinin Antagonism | − | + | − | − |
| Serum Albumin | + | + | − | − |
| Urate Synovitis | + | + | − | − |
| Adjuvant Arthritis | | | | |
| (a) Early Phase | + | + | − | + |
| (b) Late Phase | + | + | + | + |
| (c) Established Phase | + | + | − | + |
| Allergic Encephalomyelitis | + | − | + | + |
| PMN Migration | + | + | + | + |
| PMN Viability | − | ± | ± | + |
| Humoral Antibody | + | − | + | −[a] |
| Immuno-competent cell | + | − | + | −[a] |

[a]Potentiation occurs in certain circumstances.

The profile of Compound A does not resemble the anti-inflammatory drugs customarily used as standards The dose of the present pharmacological agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order to more clearly disclose the nature of the present invention, specific examples would the practice of the invention are hereinafter given. It wiould be understood, however, that this is done solely by way of example and is intended neither to delineate the scope of the invention nor to limit the ambit of the appended claims. In the examples all temperatures are given in degrees Centigrade and the following abbreviations are used: "g." for grams, "mg." for milligrams, "mol" for gram molecular weight, "ml" for milliliters, "$\phi$" for phenyl, and "MPK" for milligrams per kilogram of host body weight.

EXAMPLE 1

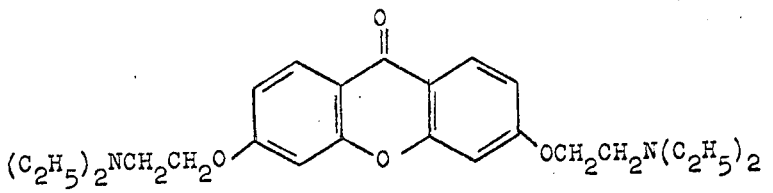

The following illustrates the preparation of 3,6-bis(2-diethylaminoethoxy)xanthen-9-one, dihydrochloride, hydrate.

A stirred mixture of 5.7 g of 3,6-dihydroxy-9-oxoxanthene, 6.72 g of 2-diethylaminoethyl chloride and 4.0 g of 50 percent sodium hydroxide in 500 ml of xylene was heated under reflux for 6 hours while water was removed by azeotropic distillation. The reaction mixture was filtered and the filtrate was extracted with 300 ml of 10 percent hydrochloric acid solution. The water layer was basified to pH 9 with concentrated ammonium hydroxide. The resulting precipitate was removed by filtration and recrystallized twice from 50 percent aqueous ethanol. This material was dissolved in ether and acidified with alcoholic hydrochloric acid solution to afford 4.8 g of product which decomposed at 217°–221°.

The molecular formula $C_{25}H_{38}N_2O_5Cl_2$ was assumed for the product, and based on that formula it was calculated that the elemental analysis by weight would be 58.02 percent carbon, 7.40 percent hydrogen, and 5.41 percent nitrogen. The assumed formula was determined to be accurate when it was found by analysis that the product actually contained 57.85 percent carbon, 7.24 percent hydrogen, 5.51 percent nitrogen. This may be expressed:

Anal. Calcd for $C_{25}H_{38}N_2O_5Cl_2$: C, 58.02; H, 7.40; N, 5.41. Found: C, 57.85; H, 7.24; N, 5.51.

The product was evaluated in the foregoing pharmacological procedure and was found to have anti-inflammatory activity at a dose of 50 MPK administered parenterally.

The product when evaluated in the foregoing interferon induction procedure was found to have interferon inducing activity.

EXAMPLE II

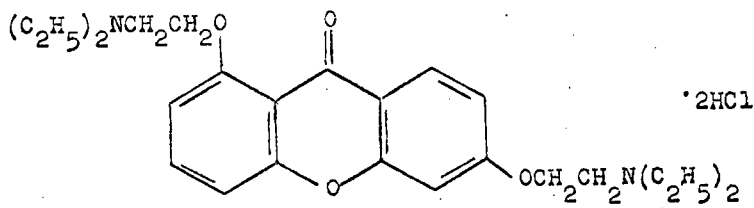

The following illustrates the preparation of 1,6-bis[2-(diethylamino)ethoxy]xanthen-9-one, dihydrochloride.

A stirred mixture of 6.2 g of 1,6-dihydroxy-9-oxoxanthene, 8.1 g of 2-diethylaminoethyl chloride and 4.8 g of 50 percent sodium hydroxide in 600 ml of xylene was heated under reflux for 6 hours while water was removed by azeotropic distillation. The reaction mixture was filtered and the filtrate was extracted with 300 ml of 10 percent aqueous hydrochloric acid solution. The water layer was basified to pH 9 with concentrated ammonium hydroxide and extracted with 300 ml of ether. The ether was dried over magnesium sulfate, filtered and was acidified with alcoholic hydrochloric acid solution. The resulting precipitate was removed by filtration and recrystallized from ethanol-petroleum ether giving 3.8 g of product which decomposed at 269°–272°.

Anal. Calcd for $C_{25}H_{36}N_2O_4Cl_2$: C, 60.12; H, 7.26; N, 5.61. Found: C, 59.71; H, 7.36; N, 5.98.

The product was evaluated in the foregoing pharmacological procedure and was found to have anti-inflammatory activity at 12 to 150 MPK with 18 to 100 percent protection. Deaths were sometimes observed at doses of 75 MPK and 150 MPK. The product was also found to have immunosuppressive activity at doses of 2.5 to 75 MPK with 100 percent protection with doses administered daily for seven days or on the ninth through twelfth days after inoculation.

The product when evaluated in the foregoing interferon induction procedure was found to have interferon inducing activity.

EXAMPLE III

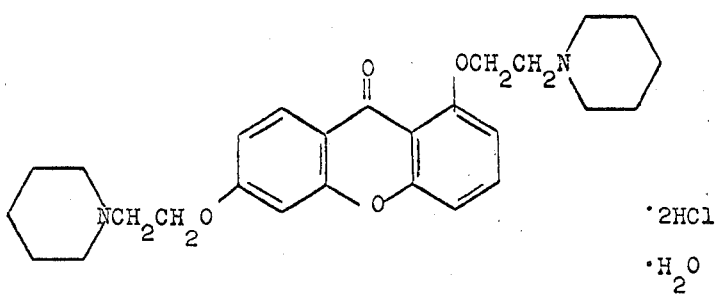

The following illustrates the preparation of 1,6-bis(2-piperidinoethoxy)xanthen-9-one, dihydrochloride, hydrate.

A stirred mixture of 4.56 g of 1,6-dihydroxy-9-oxoxanthene, 7.36 g of N-(2-chloroethyl)-piperidine hydrochloride and 6.4 g of 50 percent sodium hydroxide in 400 ml of xylene was heated under reflux for 6 hours while the water was removed by azeotropic distillation. The reaction mixture was filtered, and the filtrate was extracted with 200 ml of 10 percent aqueous hydrochloric acid solution. The water layer was basified to pH 9 with concentrated ammonium hydroxide and extracted with 200 ml of ether. The ether was dried over magnesium sulfate, filtered and was cooled in a dry ice-acetone bath. The resulting precipitate was collected and was recrystallized from ether. This material was then dissolved in ether and acidified with ethereal hydrochloric acid solution to give 1.0 g of product which decomposed at 263°–266°.

Anal. Calcd for $C_{27}H_{38}N_2O_5Cl_2$: C, 59.89; H, 7.07; N, 5.17. Found: C, 59.85; H, 7.27; N, 4.98.

The product when evaluated in the foregoing interferon induction procedure was found to have activity as an interferon inducer.

EXAMPLE IV

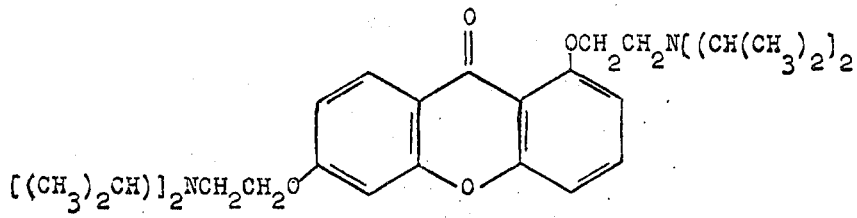

The following illustrates the preparation of 1,6-bis[(2-(diisopropylamino)ethoxy]xanthen-9-one.

A stirred mixture of 13.68 g of 1,6-dihydroxy-9-oxoxanthene, 24.0 g of 2-diisopropylaminoethyl chloride hydrochloride and 19.2 g of 50 percent sodium hydroxide in 1000 ml of xylene was heated under reflux for 6 hours while the water was removed by azeotropic distillation. The reaction mixture was filtered and the filtrate was extracted with 400 ml of 10 percent aqueous hydrochloric acid solution. The water layer was basified with concentrated ammonium hydroxide to pH 9 and then extracted with 300 ml of ether. The ether was dried over magnesium sulfate, filtered and the ether was removed on a rotary evaporator. The residue was dissolved in 100 ml of pentane and then cooled. The resulting precipitate was collected and after recrystallization from pentane afforded 3.4 g of product, having a melting point of 79°–81°.

Anal. Calcd for $C_{29}H_{42}N_2O_4$: C, 72.16; H, 8.77; N, 5.80. Found: C, 72.55; H, 9.07; N, 5.65.

EXAMPLE V

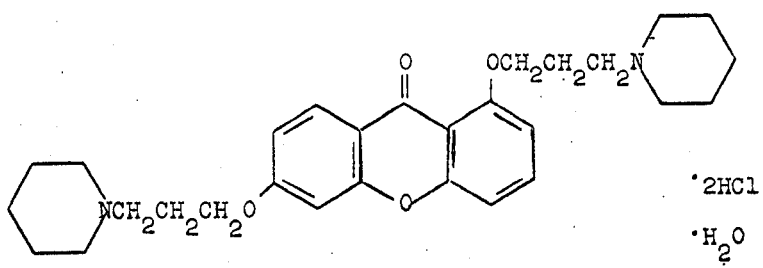

The following illustrates the preparation of 1,6-bis(3-piperidinopropoxy)xanthen-9-one dihydrochloride hydrate.

A stirred mixture of 6.84 g of 1,6-dihydroxy-9-oxoxanthene, 11.88 g of N-(3-chloropropyl)-piperidine hydrochloride and 9.6 g of 50 percent sodium hydroxide in 500 ml of xylene was heated under reflux for 6 hours while the water was removed by azeotropic distillation. The reaction mixture was filtered, and the filtrate was extracted with 300 ml of 10 percent aqueous hydrochloric acid solution. The water layer was basified to pH 9 with concentrated ammonium hydroxide and extracted with 250 ml of ether. The ether solution after drying was diluted with 50 ml of absolute ethanol and then acidified with ethereal hydrochloric acid solution. The resulting precipitate was collected and recrystallized from ethanol-petroleum ether to give 1.1 g of product which decomposed at 169°–178°.

Anal. Calcd for $C_{29}H_{42}N_2O_5Cl_2$: C, 61.15; H, 7.43; N, 4.92. Found: C, 61.09; H, 7.27; N, 4.89.

EXAMPLE VI

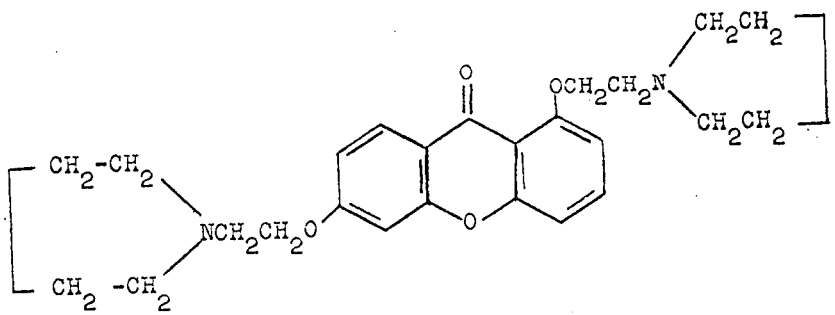

EXAMPLE VII

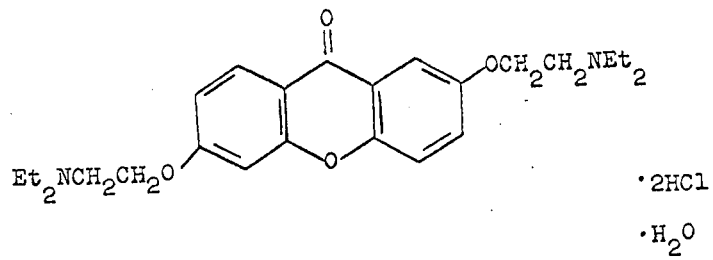

The following illustrates the preparation of 1,6-bis[2-(1-hexamethyleneimino)ethoxy]xanthen-9-one.

A stirred mixture of 6.84 g of 1,6-dihydroxy-9-oxoxanthene, 11.89 g of 2-(hexamethyleneimino)-ethyl chloride hydrochloride and 9.6 g of 50 percent sodium hydroxide in 500 ml of xylene was heated under reflux for 5 hours while the water was removed by azeotropic distillation. The reaction mixture was filtered, and the filtrate was extracted with 250 ml of 10 percent aqueous hydrochloric acid solution. The water layer was basified to pH 9 with concentrated ammonium hydroxide and extracted with 300 ml of ether. The ether was dried over magnesium sulfate, filtered and was removed on a rotary evaporator. The residue was dissolved in 50 ml of heptane and was cooled. The resulting precipitate was collected and recrystallized twice from heptane to give 2.0 g of product having a melting point of 78°–80°.

Anal. Calcd. for $C_{29}H_{38}N_2O_4$: C, 72.77; H, 8.00; N, 5.85. Found: C, 72.74; H, 7.91; N, 5.94.

The product when evaluated in the foregoing interferon induction procedure was found to have activity as an interferon inducer.

The following illustrates the preparation of 2,6-bis(2-diethylaminoethoxy)xanthen-9-one, dihydrochloride, hydrate.

A stirred mixture of 11.4 g of 2,6-dihydroxy-9-oxoxanthene, 17.2 g of 2-diethylaminoethyl chloride hydrochloride and 16 g of 50 percent sodium hydroxide in 1000 ml of xylene was heated under reflux for 5 hours while the water was removed by azeotropic distillation. The reaction mixture was filtered, and the filtrate was extracted with 250 ml of 10 percent aqueous hydrochloric acid solution. The water layer was basified with concentrated ammonium hydroxide to pH 9 and was then cooled. The developing precipitate was collected and recrystallized from ethyl acetate-petroleum ether. This material was dissolved in ethanol and was acidified with ethereal hydrochloric acid solution to give 8.1 g of product, which decomposed at 200°–203°.

Anal. Calcd for $C_{25}H_{38}N_2O_5Cl_2$: C, 58.02; H, 7.40; N, 5.41. Found: C, 57.75; H, 7.08; N, 5.34.

The product when evaluated in the foregoing interferon induction procedure was found to have interferon inducing activity.

What is claimed is:
1. A method of reducing inflammation in a mammalian host comprising orally administering to the host an effective amount of 1,6-bis(2-piperidinoethoxy)xanthen-9-one, dihydrochloride, hydrate.

* * * * *